United States Patent [19]
Ward et al.

[11] Patent Number: 5,427,440
[45] Date of Patent: Jun. 27, 1995

[54] BRAKING SYSTEM FOR A VEHICLE

[75] Inventors: Andrew J. Ward, Birmingham; David C. Hurst, Solihull, both of England

[73] Assignee: Lucas Industries plc, Solihull, England

[21] Appl. No.: 94,096

[22] Filed: Nov. 19, 1993

[30] Foreign Application Priority Data

Feb. 5, 1991 [GB] United Kingdom ............... 9102472

[51] Int. Cl.6 .................... B60T 8/00; B60T 13/66
[52] U.S. Cl. ................................ 303/3; 303/7; 303/9; 303/15
[58] Field of Search ............ 303/3, 7, 8, 9, 15, 303/6.01, 9.61, 22.4, 22.5, 20

[56] References Cited

U.S. PATENT DOCUMENTS 4,436,347 3/1984 Stumpe ................... 303/15 X

FOREIGN PATENT DOCUMENTS 345203 12/1989 European Pat. Off. .
3423944 1/1986 Germany ................... 303/3
3617356 11/1987 Germany ................... 303/3

Primary Examiner—Robert J. Oberleitner
Assistant Examiner—Peter M. Poon
Attorney, Agent, or Firm—Oblon, Spivak, McClelland, Maier, & Neustadt

[57] ABSTRACT

A braking system for a vehicle having primary and secondary braking circuits includes a secondary braking circuit having a secondary source of braking pressure connectable to a braking actuator and including a three-port, two-position, inlet solenoid valve having two inlet ports and one outlet port. One of the inlet ports is connected to an outlet of an inlet solenoid valve of the primary braking circuit and to the inlet of an exhaust solenoid valve of the primary braking circuit. The other inlet is connected to a secondary source of braking pressure. The outlet port is connected to the braking actuator. The inlet solenoid valve is movable by an output signal from an electronic control unit.

10 Claims, 4 Drawing Sheets

BRAKING SYSTEM FOR A VEHICLE

BACKGROUND OF THE INVENTION

FIELD OF THE INVENTION

The present invention relates to braking systems for vehicles, and in particular to electronic braking systems (EBS) which have a back-up braking facility. The invention is particularly suited to trailer braking systems for towing vehicles.

EP 0250738A (Bosch) discloses a method of checking that the level of pressure in the main circuit is consistent with both the drivers demand and the auxiliary backup pressure.

On every brake application, once the drivers demand exceeds a predetermined pressure level of 4 bar, the electronically controlled main circuit is disabled and the auxiliary backup circuit is enabled. A pressure sensor located downstream of the two valves (5) and (6) measures the differential between the main circuit and auxiliary circuit at the changeover point, and if the differential exceeds a predetermined level then the controller flags un an error.

With increasing demand the auxiliary circuit remains in operation and is directly connected to the brake. It is stated that this is because the auxiliary circuit pressure can be controlled more accurately with the solenoid valve 6. This is because once the pressure has risen within the actuator level where all the 'slack' has been removed, only a small increase in additional volume is required to achieve a corresponding larger increase in pressure. Therefore, valve 6, must be a 'fine control' solenoid valve, only capable of small volume flow rates. Bearing this in mind, if a fault developed with either valve (5) or (7) and the main circuit was disabled permanently, the backup auxiliary system operating from the foot valve (9) via the fine control, valve (6) would be responsible for the total brake control. This would mean that a brake application would be extremely slow, the full brake volume now having to pass through the valve (6), additionally a brake release would be equally as slow, thus holding the brake in the applied condition when the drivers demand is removed.

In the arrangements as shown several major faults exist which mean that in the event of the main circuit failure even with the introduction of the auxiliary backup circuit, the brake itself cannot be applied. Referring to FIG. 1 in particular, if the exhaust valve (7) seized in the open condition thus permanently opening the brake actuator to atmosphere, the application of pressure via the 'fine control' valve (6) would simply be exhausted to atmosphere, having had no apparent effect on the brake actuator.

Thus, although EP 0250738 shows that a backup auxiliary pressure can be introduced into a service brake actuator via a solenoid valve, it does not show how to achieve correct application of the backup auxiliary pressure when a fault exists in the main circuit system.

In EP 0345203A (Daimler-Benz), an attempt has been made to isolate the backup auxiliary system from the main service line to prevent discharge of the auxiliary backup system via any fault developed in the main service control channel. However, in an attempting to achieve the above other areas of concern have not been attended to.

Normally, a failure in the service control channel would take the form of a sticking or leaking inlet or exhaust valve (5) or (6). If this occurs, it must be ensured that the auxiliary system can be switched on and it must be Guaranteed that once employed the backup system cannot be disengaged by any fault in the service control line.

In the Daimler-Benz arrangement, if a fault as above developed, i.e., inlet valve (5) developed a leak or seized in the open position, then, even if the exhaust valve was open, pressure in the small pilot line 7.2 would develop to a sufficient enough level, 0.02 bar, to cause the 3/2 valve to switch into the 'working' position, therefore isolating the backup system, just when required, during an inlet valve failure.

If a corresponding fault developed in the exhaust valve (6), for example, if the valve seized in the closed position, the pressure in the service line together with pressure in the pilot line could not be exhausted to atmosphere. Therefore, the pilot valve would remain latched and the backup system would be isolated from the brake actuator, at again, the very instant it would be required.

EP 0345203 also shows embodiments where within the pilot line 7.2a2/2 flow control valve is placed. This valve is solely used for 'desensitising' the pilot valve from ABS operation, where upon an antilock brake dump the pressure in the (5) and therefore also line (7.2) is exhausted to atmosphere, this would cause the 3/2 pilot valve to unlatch and bring in the auxiliary backup pressure. Therefore a high demand pressure would be fed directly from the foot valve (9) to the brake actuator (3) just at the moment when the ABS system is trying to remove all pressure from the actuator. To cope with this situation a restriction is placed in the pilot line in the 'off' direction so as to prevent the rapid decay of pilot pressure and therefore unlatching of the 3/2 valve.

Unfortunately, due to the fact that by their very nature, pilot lines contain very small volumes, even with a severe restriction in 14 ne (7-2) the pilot pressure will still decay very quickly, therefore on a skid cycle of long duration i.e. low m$\mu$ surface such as ice or snow, the 2/2 position valve as shown, even if it is solenoid controlled, will not prevent the auxiliary back-up system from being deployed, causing a total lockup of the brake in question.

Although EP 0345203 does teach us to attempt to isolate the main service line pressure from the auxiliary backup system, it does not teach use, as with EP 0250738 Bosch, how to prevent the backup from being disabled by a fault in the main service line control system.

DE 4004502 (Daimler-Benz) is a development of EP 0345203A, in which the problem of coping with a long skid cycle as discussed above has been realised. A solution is proposed where the 2/2 flow control valve with a large restriction in the pilot line is replaced by a 2/2 solenoid controlled isolation valve. This would indeed prevent the unlatching of the 3/2 valve on an ABS cycle. It is further stated that the 2/2 valve can only be used during ABS as it can be seen if the logic of controller (4) is followed. An ABS signal must be present at AND gate (4.2) in order to provide part of the signal at AND gate (4.1.1$h$) which switches on the drive circuitry for the 2/2 solenoid. Therefore this valve can never be used as part of some auxiliary circuit enable/disable control system for normal braking as the basic ABS signal would not be present. Bearing this in mind, it is obvious that claim 2 is unworkable as it requires the 2/2 valve to work when no skid signal is present. Apart from the above, the device of DE 4004502 is identical to that of EP 0345203 and being so, it also suffers the same failure problems.

SUMMARY OF THE INVENTION

Accordingly, it is an object of the present invention to provide a braking system which allows deployment of an auxiliary braking pressure regardless of any fault condition that exists.

In accordance with the present invention, there is provided a braking system for a vehicle, comprising primary and secondary braking circuits, the primary braking circuit comprising:

a vehicle brake pedal;

a transducer connected to the brake pedal and generating braking demand signals in response to depression of the brake pedal;

an electronic control unit which receives the braking demand signal from the pedal;

a first inlet solenoid valve having an inlet connected to a primary source of braking pressure and an outlet connected to a braking actuator, and being movable from a closed position to an open position by an output braking signal from the electronic control unit, thereby to connect the primary source of braking pressure to the braking actuator;

an exhaust solenoid valve having an inlet connectable with the braking actuator and an outlet connected to atmosphere, and which is controllable by an output braking signal from the electronic control unit, thereby to release braking pressure from the braking actuator;

the secondary braking circuit comprising:

a secondary source of braking pressure connectable to the braking actuator, and being characterized by a second inlet solenoid valve comprising a three-port, two-position solenoid valve having two inlet ports and one outlet port, one inlet port being connected to the outlet of the first inlet solenoid valve and to the inlet of the exhaust solenoid valve, the other inlet being connected to the secondary source of braking pressure, and the outlet port being connected to the braking actuator, the second inlet solenoid valve being movable by an output signal from the electronic control unit, indicating correct operation of the electronic control unit, to a primary braking position in which the secondary source of braking pressure is isolated from the braking actuator and the first inlet solenoid valve and the exhaust solenoid valve are connected to the braking actuator, from a secondary braking position in which the secondary source of braking pressure is connected to the braking actuator.

One alternative arrangement has 3/2 (three-port, two-position) valve. One inlet port of the 3/2 valve is connected to the output of the first inlet valve (and the inlet of the outlet valve) and the other inlet port of the 3/2 valve is connected to the secondary source of braking pressure. In this arrangement, the first inlet valve would be a normally closed (NC) valve, and the outlet valve would preferably be a (NO) valve. In the event of failure of the primary braking circuit, the first inlet valve would close and the outlet valve would open, thereby removing any residual pressure from the primary circuit. The 3/2 valve is de-energised, connecting the back-up pressure to the load.

BRIEF DESCRIPTION OF THE DRAWINGS

By way of example only, specific embodiments of the present invention will now be described, with reference to the accompanying drawings, in which.

DESCRIPTION OF THE PREFERRED EMBODIMENTS

Figure 1:
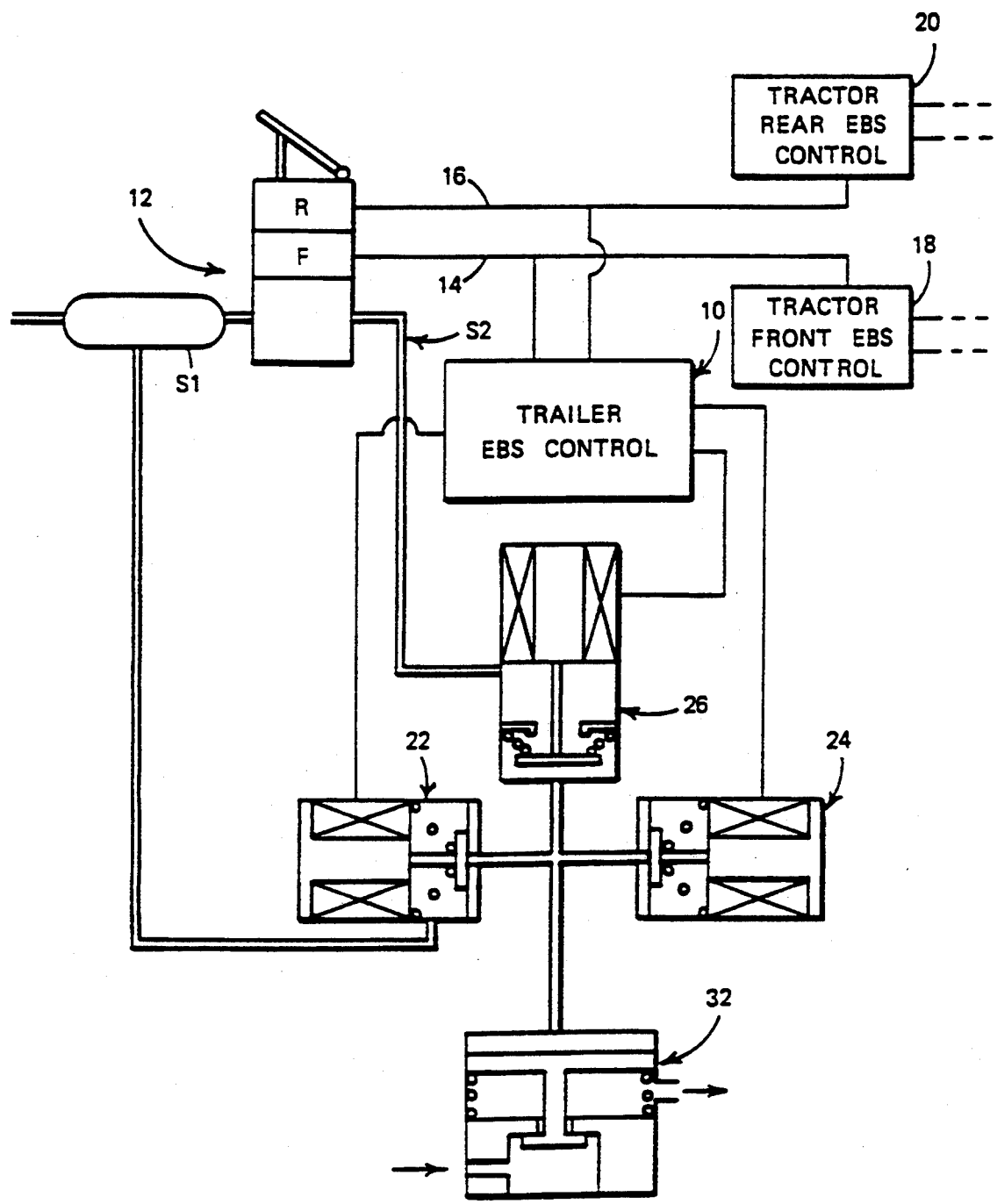
FIG. 1 is a diagrammatic illustration of an example of a trailer braking system which does not form part of the present invention.

Referring now to the drawings, wherein like reference numerals designate identical or corresponding parts throughout the several views, and more particularly to FIG. 1 thereof, an electronic braking system (EBS) for a trailer, but which does not form part of the invention, comprises an electronic braking system unit 10 which receives electrical braking demand signals from a brake pedal 12 via two independent channels 14, 16. The channels 14, 16 correspond to the signals for the front and rear braking of the tractor respectively, and the same signals are also used to effect tractor braking, via the front and rear tractor EBS control units 18, 20.

The EBS brake pedal 12 provides electrical signals to the trailer braking control 10 proportional to the deceleration demanded by the driver. By using suitable software within the trailer control 10, the control is able to respond to those demands by controlling three solenoid valves 22, 24, 26, illustrated schematically.

The pedal also operates an upright proportional valve 12a (i.e. its output increases with increased pedal depression) whenever it is depressed. The input of valve 12a is fed with pressurised fluid (usually air) from a primary source of braking pressure S1, e.g. a pressurised air reservoir, and the output of valve 12a forms a secondary, or auxiliary, source of braking pressure S2.

A solenoid valve 22 is a normally closed (NC) inlet solenoid valve, and solenoid valve 24 is also a normally closed (NC) outlet valve. As will be explained, by controlling the opening and closing of the inlet and outlet valves 22, 24, the supply of pressurised air from the primary pressure source S1 (which is connected directly to valve 22) to a conventional trailer braking valve 32 (illustrated schematically) can be controlled. The trailer valve is conventional, and comprises a pressure controlled piston whose lower end is formed into a valve closure member which controls the flow of pressurised air to the trailer brakes. The solenoid valve 26 is a normally open (NO) valve whose input is connected to the output of valve 12a, i.e. the second source of pressurised air S2, and whose outlet is connected to the trailer braking valve 32 and to the outlet of valve 22 and inlet of valve 24.

Under normal, non-braking conditions, the trailer control 10 sends no actuating signals to any of the three valves 22, 24, 26 and thus the valve 26 is maintained in an open position, and the valves 22, 24 are held in their closed positions, thereby preventing the application of any braking pressure to the trailer braking valve 32 since the output of valve 12a is zero for no brake pedal depression. Normal braking is thus achieved by means of the solenoid valves 22 and 24 and 26, the solenoid valve 26 being closed by actuation of its solenoid, the solenoid valve 22 being opened by actuation of its solenoid to allow pressurised air to be applied from the primary source S1 to the braking valve 32, and the exhaust valve 24 being opened by actuation of its solenoid, with the inlet valve 22 shut, to exhaust the trailer braking valve 32. Although the output of valve 12 a is non-zero upon brake pedal depression, the pressure generated does not reach valve 32 because under normal braking conditions valve 26 shuts whenever the pedal is depressed.

Under normal braking operations, as explained above, the second inlet valve 26 is held shut whenever braking is demanded by depression of the pedal 12 by actuation of its solenoid by the trailer control 10.

In the event of power failure or fault shutdown which would render the trailer control 10 inactive, no actuation signals are sent to the solenoids of the valves 22, 24 or 26, with the result that valves 22 and 24 are held shut in their normally closed positions, and valve 26 is allowed to open, thereby connecting the secondary braking pressure source S2 to the trailer braking valve 32. In this way, if the electronic braking system fails, the secondary braking pressure (i.e. the output from valve 12a) is thus applied to the trailer braking valve 32, thereby providing back-up braking.

The outlet valve 24, in normal braking, controls the dumping of control pressure applied to the trailer braking valve 32. In a conventional system, the valve is a normally open (NO) valve, which in the even of a system failure allows any pressure trapped in the valve 32 to be vented to atmosphere. In this arrangement, this valve is an NC valve, so that in the event of the aforementioned failure, total control can be handed over to the back-up system without any of the back-up pressure being vented to atmosphere through the exhaust valve.

As mentioned above, the normal operation of this system is as follows. When ever braking is demanded by depression of the pedal 12, the NO back-up inlet valve 26 is energised so as to isolate the backup pressure S2 from the valve 32. The NC inlet valve 22 is cycled under the control of the trailer control 10 to control brake application, and the NC exhaust valve 24 is similarly cycled to control brake dump. If a system failure occurs which requires the back-up system to be supplied to the value 32, then all three solenoid valves are de-energised, thereby isolating the valve 32 from the primary source of braking pressure S1, and shutting off the exhaust valve 24, while at the same time connecting the valve 32 to the back-up pressure source 30. From this point onwards, the trailer braking pressure is controlled directly by variations in the back-up pressure 30.

The back-up pressure S2 can be generated in a pedal actuated valve as described, but typical examples of some alternative sources are:

(a) from a controlled pneumatic circuit on the tractor vehicle; or
(b) from the tractor or trailer supply pressure reservoir.

The aforementioned configuration has the advantage that for all normal operation the back-up valve has no influence on the operation of the system. In other words, the normal flow of pressure does not have to pass through the back-up valve 26.

The first arrangement does, however, have one disadvantage, in that if the exhaust valve 24 sticks when deactivated, then some of the back-up pressure supplied through the back-up valve 26 will be lost through the open valve 24. The first embodiment of the invention, illustrated in FIG. 2, avoids this problem by connecting the back-up pressure S2 when appropriate, downstream of the solenoid valves 22, 24 via a 3/2 (three-port, two-position) solenoid valve 34 which in its back-up mode connects the secondary source of pressure to the trailer braking valve 32 and isolates the trailer braking valve from both of the solenoid valves 22, 24'. Although all the flow to the valve 32 now has to pass backwards and forwards through the 3/2 valve 34, thus reducing the dump responsiveness of the normal braking system, for the controls of a trailer braking system which does not require rapid reactions it is believed that this minor drawback is not a serious disadvantage.

Figure 2:
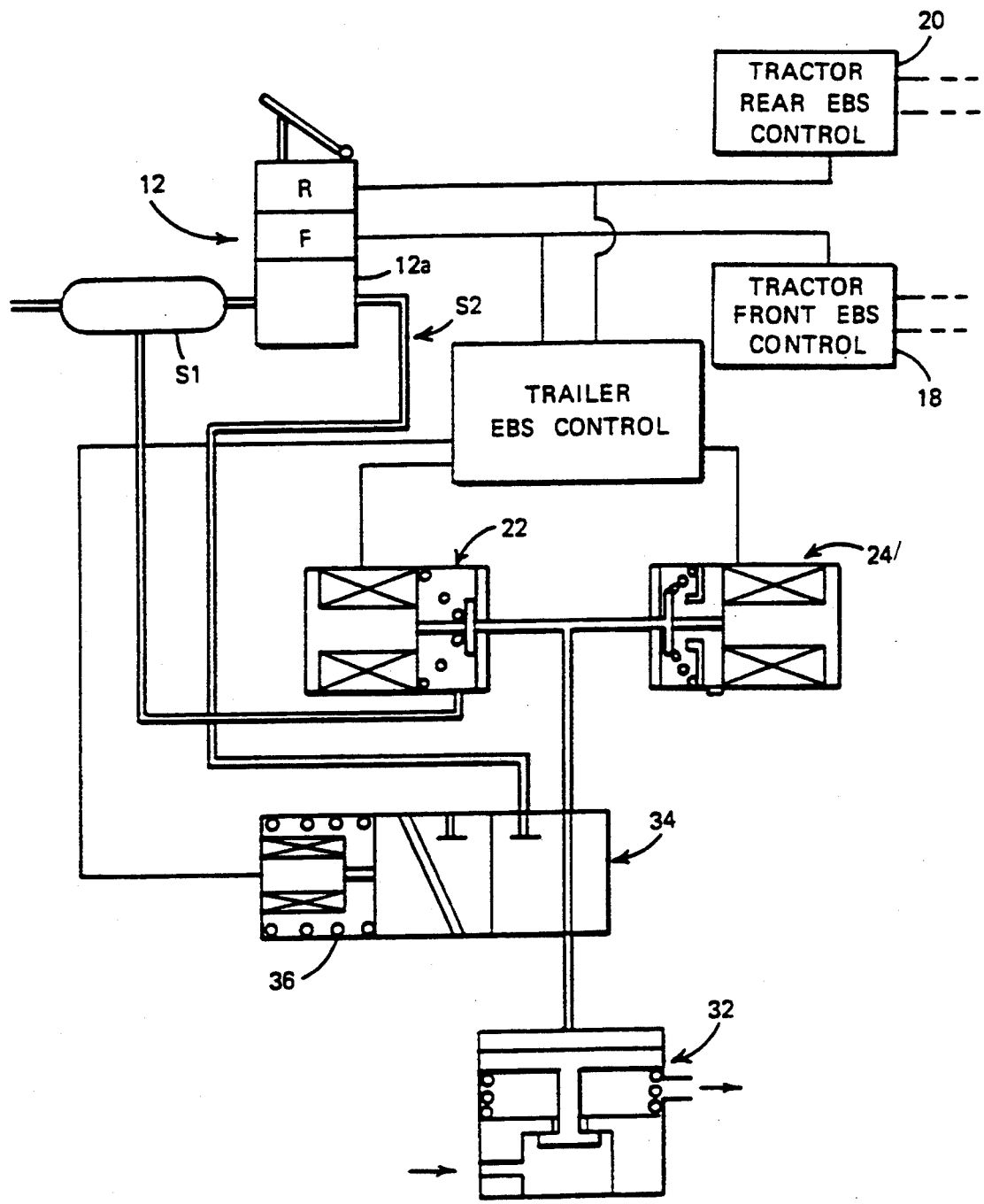
FIG. 2 is a diagrammatic illustration of an embodiment of trailer braking system in accordance with the present invention.

Considering FIG. 2 in more detail, this embodiment comprises an NC solenoid inlet valve 22 as in the first embodiment and an NO solenoid exhaust valve 24', both under the control of the trailer control braking unit 10 for applying and releasing the primary brake pressure S1. The braking system is otherwise identical to the first embodiment. In the event of a system failure, the inlet valve 22 closes, isolating the first pressure source S1 from the valve 32, and the NO exhaust valve 24' opens to atmosphere to vent any pressure within the primary braking circuit. For normal braking operation, whenever braking is demanded by depression of the pedal 12 the 3/2 valve 34 is energised against the force of a restoring spring 36 to hold open the passage between the control valves 22, 24, and the trailer braking valve 32, at the same time isolating the back-up pressure S2 from the trailer braking valve 32. In the event of a system failure, the solenoid of the 3/2 valve is not energised and the restoring spring 36 holds the 3/2 valve 34 into its back-up position, thereby connecting the secondary source of pressure S2 to the trailer braking valve 32.

In an alternative construction, the trailer braking valve 32 in both of the preceding arrangements can be dispensed with, and instead the connection can be directly to the brake actuator of the trailer wheels.

Figure 3:
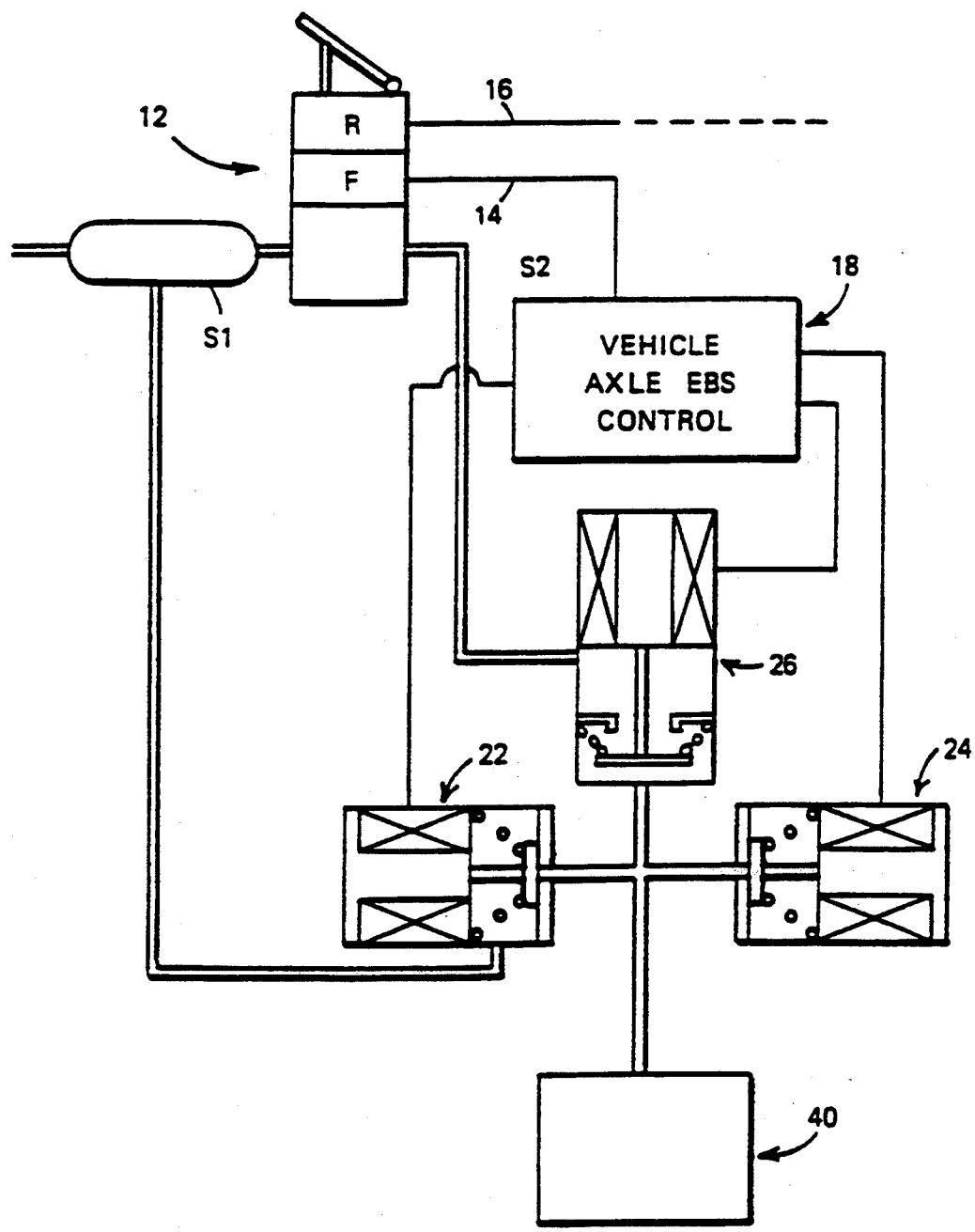
FIG. 3 is a diagrammatic illustration of a second example of vehicle braking system which does not form part of the present invention.

A third arrangement, which does not form part of the invention and which is illustrated in FIG. 3, provides a back-up braking facility for the front and rear wheels of a vehicle other than a trailer, for example a tractor unit.

The arrangement is substantially identical to the first arrangement and the same reference numerals have been used to identify identical components, but only the control of the front brakes of the vehicle have been described. The control of the rear vehicle brakes is identical. As in the first embodiment, the front EBS axle control unit 18 receives electrical braking demand signals from a brake pedal 12 via channel 14. The brake pedal 12 provides electrical signals to the braking control 18 proportional to the deceleration demanded by the driver. By using suitable software within the control unit 18, the control is able to respond to those demands by controlling three solenoid valves 22, 24, 26, identical to the valves 22, 24, 26 of the first arrangement.

The operation of the valves in both the normal and back-up braking mode is identical to that of the first arrangement, and the only substantial difference is that instead of being connected to a trailer braking valve 32 or to the trailer brake system directly as in the first embodiment, the normal or back-up braking pressure is supplied to the front vehicle brake actuating cylinder 40.

A second embodiment is illustrated in FIG. 4 which again provides a back-up braking facility for the front and rear wheels of a vehicle other than a trailer, for example a tractor unit. Only the braking control of the front vehicle brakes has been described, but the control of the rear vehicle wheel brakes is identical. The arrangement is very similar to the third embodiment described above, and the same reference numerals have been used to identify identical components, but as for the FIG. 2 embodiment, the NC solenoid exhaust valve 24 is replaced with an NO solenoid valve 24'. Also, as in the FIG. 2 embodiment, a 3/2 valve 34 is provided, and for normal braking operation the valve 34 is energised against the force of its restoring spring 36 to hold open the passage between the control valves 22, 24 and vehicle front brake actuator 40, at the same time isolating the back-up pressure S2 from the vehicle front brake actuating cylinder 40.

As for the FIG. 2 embodiment, in the event of a system failure, the solenoid of the 3/2 valve is de-energised and the restoring spring 36 displaces the 3/2 valve 34 into its back-up position, thereby connecting the secondary source of pressure S2 to the vehicle front brake actuating cylinder 40.

Figure 4:
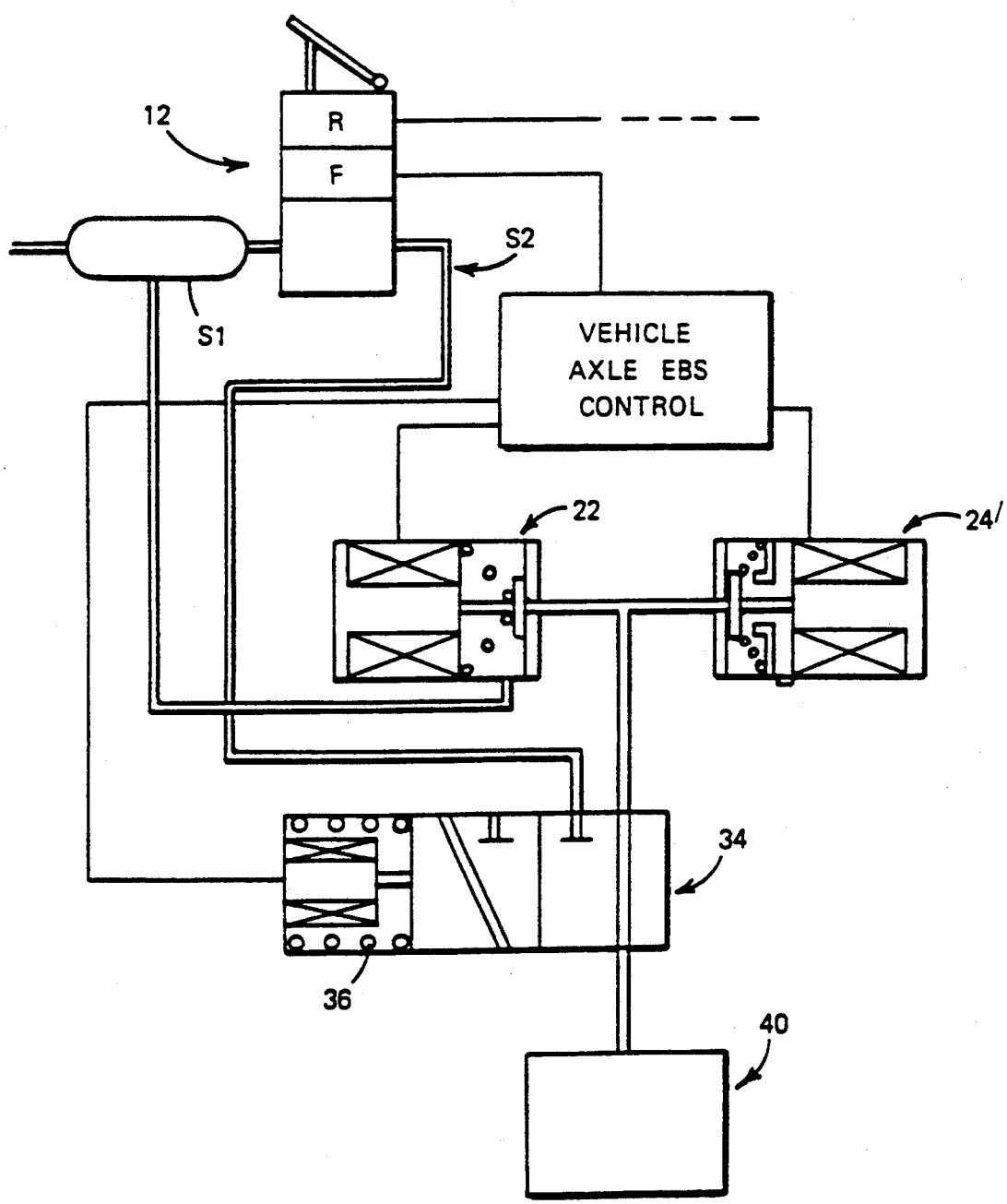
FIG. 4 is a diagrammatic illustration of a second embodiment of vehicle braking system in accordance with the present invention.

The arrangements of FIGS. 3 and 4 may be used for any vehicle, and/or may be used in conjunction with the trailer braking system of FIGS. 1 and 2.

As for the arrangements of FIGS. 1 and 2, the back-up pressure may be taken from various sources, as explained for the first embodiment.

Obviously, numerous modifications and variations of the present invention are possible in light of the above teachings. It is therefore to be understood that within the scope of the appended claims, the invention may be practiced otherwise than as specifically described herein.

We claim:

1. A braking system for a vehicle, comprising primary and secondary braking circuits, the primary braking circuit comprising:
   a vehicle brake pedal;
   a transducer connected to the brake pedal and generating braking demand signals in response to depression of the brake pedal;
   an electronic control unit which receives a braking demand signal from the pedal;
   a first inlet solenoid valve having an inlet connected to a primary source of braking pressure and an outlet connectable to a braking actuator, and being movable from a closed position to an open position by an output braking signal from the electronic control unit, thereby to connect the primary source of braking pressure to the braking actuator;
   an exhaust solenoid valve having an inlet connectable to the braking actuator and an outlet connected to atmosphere, and which is controllable by an output braking signal from the electronic control unit, thereby to release braking pressure from the braking actuator;
   the secondary braking circuit comprising:
   a secondary source of braking pressure connectable to the braking actuator, and including a second inlet solenoid valve comprising a three-port, two-position solenoid valve having two inlet ports and one outlet port, one inlet port being connected to the outlet of the first inlet solenoid valve and to the inlet of the exhaust solenoid valve, the other inlet being connected to the secondary source of braking pressure and the outlet port being connected to the braking actuator, the second inlet solenoid valve being movable by an output signal from the electronic control unit, indicating correct operation of the electronic control unit, to a primary braking position in which the secondary source of braking pressure is isolated from the braking actuator and the first inlet solenoid valve and the exhaust solenoid valve are connected to the braking actuator, from a secondary braking position in which the secondary source of braking pressure is connected to the braking actuator.

2. A braking system as claimed in claim 1, wherein the second inlet solenoid valve comprises biassing means which bias the valve towards the secondary braking position.

3. A braking system as claimed in claim 1 or 2, wherein the first inlet solenoid valve and the exhaust solenoid valve are biassed towards a closed position and an open position respectively by respective biassing means, and wherein each of the first inlet solenoid valve and the exhaust solenoid valve is displaceable into an open and a closed position respectively by a respective output braking signal from the electronic control unit.

4. A braking system as claimed in claim 1 or 2, further comprising a service brake valve controlled by depression of the vehicle brake pedal, the primary source of braking pressure being connected to the inlet of the first inlet solenoid valve and to the inlet of the service brake valve, wherein operation of the service brake valve modulates the primary source of braking pressure and outputs from an output thereof a pressure which forms the secondary source of braking pressure.

5. A braking system as claimed in claim 4, wherein the secondary source of braking pressure comprises a controlled pneumatic circuit to the vehicle.

6. A braking system as claimed in claim 4 wherein the secondary source of braking pressure comprises a supply pressure reservoir of the vehicle.

7. A braking system as claimed in claim 6, wherein the braking actuator comprises an actuating cylinder of a vehicle brake.

8. A braking system as claimed in claim 4, wherein the braking actuator comprises a relay valve having a valve inlet, a valve outlet, a valve seat disposed between the valve inlet and the valve outlet and a valve closure member engageable with the valve seat, and whose position is controllable by the application of fluid pressure.

9. A braking system as claimed in claim 8, wherein the pressurised fluid comprises compressed air.

10. A braking system as claimed in claim 8, wherein the primary and secondary sources of braking pressure comprise sources of compressed air.

* * * * *

UNITED STATES PATENT AND TRADEMARK OFFICE
CERTIFICATE OF CORRECTION

PATENT NO. : 5,427,440
DATED : June 27, 1995
INVENTOR(S) : Andrew J. WARD, et al.

It is certified that error appears in the above-indentified patent and that said Letters Patent is hereby corrected as shown below:

Title page,
Please delete Item [22] from the title page. The PCT information has been omitted from the title page. It should read:

--[22] PCT Filed:        Feb. 5, 1992

[86] PCT No.:         PCT/GB92/00213

§ 371 Date:        Nov. 19, 1993

§ 102(e) Date:     Nov. 19, 1993

[87] PCT Pub. No.:    WO92/13740

PCT Pub. Date:     Aug. 20, 1992--

Signed and Sealed this

Twenty-fourth Day of October, 1995

Attest:

BRUCE LEHMAN

Attesting Officer          Commissioner of Patents and Trademarks